(12) United States Patent
Burger et al.

(10) Patent No.: US 11,954,949 B2
(45) Date of Patent: Apr. 9, 2024

(54) SYSTEMS AND METHODS FOR IDENTIFYING A VEHICLE BASED ON MESSAGES RECEIVED BY A CONTROL AREA NETWORK BUS OF THE VEHICLE

(71) Applicant: Verizon Connect Development Limited, Park Dublin (IE)

(72) Inventors: Louis Burger, Dublin (IE); Sean McGinn, Dublin (IE)

(73) Assignee: Verizon Connect Development Limited, Dublin (IE)

( * ) Notice: Subject to any disclaimer, the term of this patent is extended or adjusted under 35 U.S.C. 154(b) by 335 days.

(21) Appl. No.: 17/248,021

(22) Filed: Jan. 5, 2021

(65) Prior Publication Data

US 2022/0215693 A1 Jul. 7, 2022

(51) Int. Cl.
*G07C 5/00* (2006.01)
*B60W 40/08* (2012.01)
(Continued)

(52) U.S. Cl.
CPC ............. *G07C 5/008* (2013.01); *B60W 40/08* (2013.01); *G07C 5/0841* (2013.01); *H04L 12/40* (2013.01); *H04L 2012/40215* (2013.01)

(58) Field of Classification Search
CPC .... G07C 5/008; G07C 5/0841; G07C 5/0808; G07C 5/0816; B60W 40/08; H04L 12/40; H04L 2012/40215; H04L 63/10; H04L 67/12; H04L 12/40078; H04L 12/66; H04L 2012/40273; H04L 45/74; H04L 63/1425; H04L 69/08; H04L 12/40169; H04L 41/069; H04L 43/18; H04L 63/102; H04L 69/06; H04L 69/22; H04L 69/26; H04L 12/40189; H04L 12/40202; G05B 2219/24001; G05B 2219/24059; G05B 2219/24053; G05B 2219/24054; G05B 2219/24058; G05B 2219/24065; G05B 2219/24066; G05B 2219/24068; G05B 2219/24069; G05B 2219/24072; H04W 4/48; Y02T 10/40

See application file for complete search history.

(56) References Cited

U.S. PATENT DOCUMENTS 10,162,625 B2 * 12/2018 Vangelov .............. H04L 67/12
11,656,965 B2 * 5/2023 Hu ..................... G06F 11/3003
714/51

(Continued)

OTHER PUBLICATIONS

AN-ION-1-3100 Introduction to J1939 (Year: 2010).*

*Primary Examiner* — Thomas Ingram
*Assistant Examiner* — Faris Asim Shaikh

(57) ABSTRACT

In some implementations, a vehicle device may receive, from a controller area network (CAN) bus of a vehicle and for a time period, messages received by the CAN bus after an engine of the vehicle is turned on. The vehicle device may combine identifiers provided in unique addresses, of the messages received by the CAN bus, to generate a unique identifier, and may utilize the unique identifier to determine data identifying a year, a make, and a model of the vehicle. The vehicle device may utilize the data identifying the year, the make, and the model of the vehicle to determine non-standard parameter identifiers associated with an engine control module of the vehicle.

20 Claims, 9 Drawing Sheets

(51) Int. Cl.
   *G07C 5/08* (2006.01)
   *H04L 12/40* (2006.01)

(56) References Cited

U.S. PATENT DOCUMENTS

| | | | | |
|---|---|---|---|---|
| 2003/0080619 | A1* | 5/2003 | Bray | H04L 12/403 |
| | | | | 340/425.5 |
| 2003/0200017 | A1* | 10/2003 | Capps | H04L 12/12 |
| | | | | 701/1 |
| 2005/0203673 | A1* | 9/2005 | El-Hajj | G06Q 10/08 |
| | | | | 701/1 |
| 2010/0070107 | A1* | 3/2010 | Berkobin | G07C 5/008 |
| | | | | 701/1 |
| 2010/0268423 | A1* | 10/2010 | Breed | B60N 2/002 |
| | | | | 701/45 |
| 2013/0110344 | A1* | 5/2013 | Merg | G07C 5/0825 |
| | | | | 701/31.4 |
| 2013/0204484 | A1* | 8/2013 | Ricci | G06F 17/00 |
| | | | | 701/29.6 |
| 2018/0013578 | A1* | 1/2018 | Gozloo | G06F 13/00 |
| 2018/0176107 | A1* | 6/2018 | Beilin | H04L 43/0817 |
| 2021/0092018 | A1* | 3/2021 | Fang | H04L 61/4511 |
| 2022/0303305 | A1* | 9/2022 | Shin | H04L 12/40032 |

* cited by examiner

US 11,954,949 B2

SYSTEMS AND METHODS FOR IDENTIFYING A VEHICLE BASED ON MESSAGES RECEIVED BY A CONTROL AREA NETWORK BUS OF THE VEHICLE

BACKGROUND

On-board diagnostics (OBD) parameter identifiers (PIDs) are codes used to request data from a vehicle for diagnostic purposes (e.g., to perform a diagnostic of the vehicle). Vehicle manufacturers are required to manufacture vehicles that support a subset of these codes in order to comply with governmental regulations.

DETAILED DESCRIPTION OF PREFERRED EMBODIMENTS

Figure 1A:
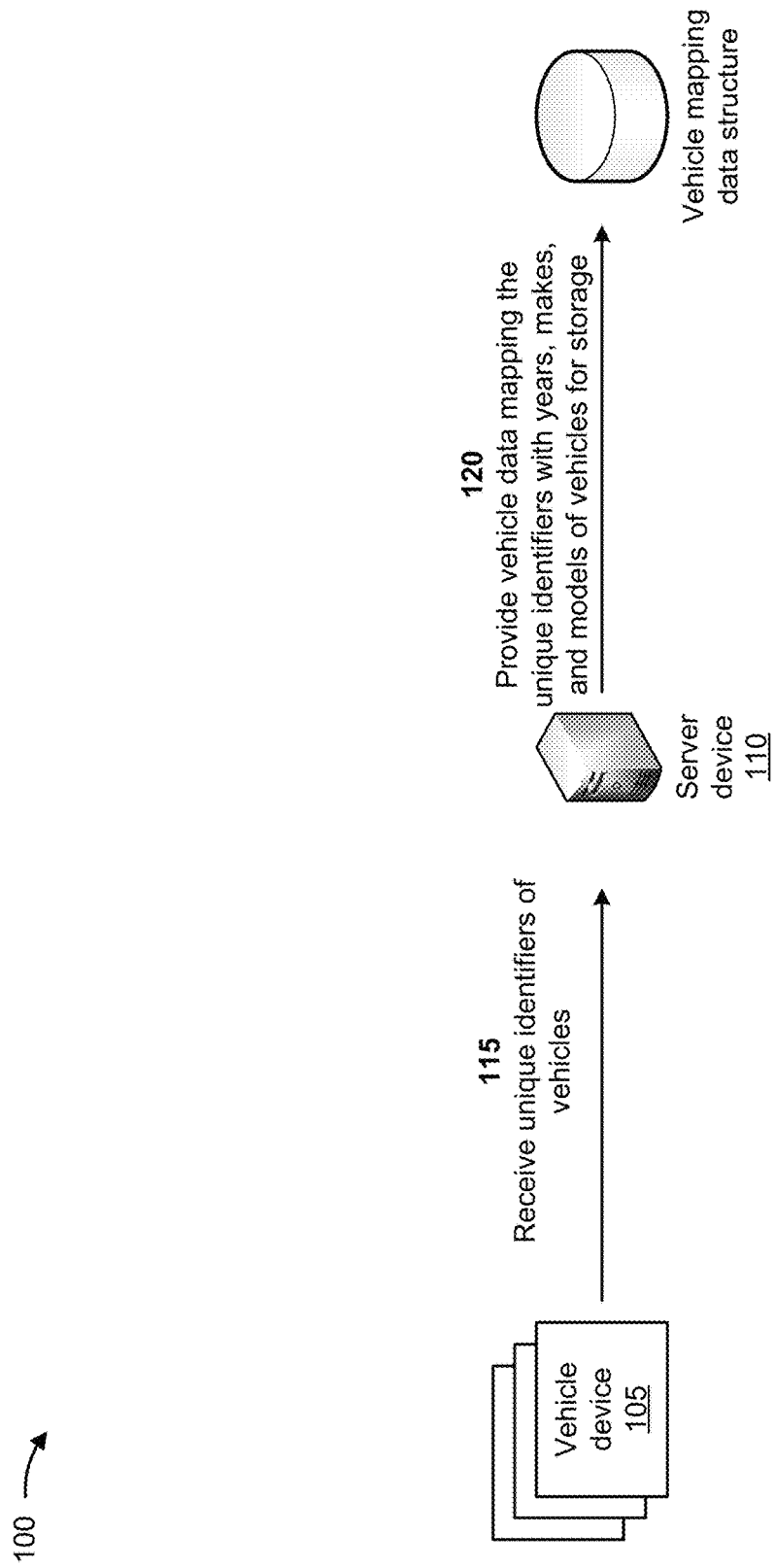
FIGS. 1A-1F are diagrams of an example associated with identifying a vehicle based on messages received by a control area network (CAN) bus of the vehicle.

The following detailed description of example implementations refers to the accompanying drawings. The same reference numbers in different drawings may identify the same or similar elements.

On-board diagnostics (OBD) parameter identifiers (PIDs) are codes used to request data from a vehicle for diagnostic purposes. OBD PIDs include PIDs that are standard (hereinafter "standard PIDs") and PIDs that are non-standard (hereinafter "non-standard PIDs"). Standard PIDs are defined by a standard developed by the Society of Automotive Engineering (SAE), namely the SAE J1979 standard. Most vehicle manufacturers comply with the SAE J1979 standard. Accordingly, vehicles (manufactured by such vehicle manufacturers) utilize the standard PIDs defined by the SAE J1979 standard. In addition to utilizing the standard PIDs, such vehicles also utilize non-standard PIDs. Such non-standards are PIDs that are defined by the vehicle manufacturers and that do not comply with the SAE J1979 standard. For example, a vehicle manufacture may develop non-standard PIDs for a vehicle based on specifications of the vehicle (e.g., based on a configuration of an engine control unit (ECU) for a year, a make, and a model of the vehicle).

Obtaining non-standard PIDs from different vehicles (e.g., different years, makes, and models) is a complicated task because of a difference in the specifications of such vehicles based on years, makes, and models of such different vehicles. A vehicle tracking unit (VTU) (e.g., a telematics device) requires identification of a vehicle (e.g., information identifying a year, a make, and a model of the vehicle) to which the VTU is connected in order to determine non-standard PIDs of the vehicle. Some VTU manufacturers obtain a vehicle identification number (VIN) from a vehicle and decode the VIN to determine a year, a make, and a model of the vehicle.

In some cases, the VIN is difficult to determine and, without the VIN, the VTU is unable to determine the non-standard PIDs. If a VIN is determined, the VTU sends the VIN to a server device to be decoded to determine the year, the make, and the model of the vehicle. The server device decodes the VIN by utilizing a third party database. In some cases, the format of some VINs may be different because not all VINs follow a standard format. Inconsistencies in the format of VINS may lead to incorrect identifications of vehicles.

Thus, current techniques for identifying a year, a make, and a model of a vehicle waste computing resources (e.g., processing resources, memory resources, communication resources, and/or the like), networking resources, and other resources associated with utilizing third party databases, incorrectly identifying vehicles, determining incorrect non-standard PIDs based on incorrectly identified vehicles, and/or performing an action based on the incorrectly non-standard PIDs.

Some implementations described herein provide a vehicle device that identifies a year, make, and model of a vehicle based on messages received by a controller area network (CAN) bus of the vehicle. For example, the vehicle device may receive, from a CAN bus of a vehicle and for a time period, messages received by the CAN bus after an engine of the vehicle is turned on. The vehicle device may combine identifiers provided in unique addresses or patterns of vehicle system calls and vehicle system initiations, of the messages received by the CAN bus, to generate a unique identifier, and may update a data store of associated address patterns and year, make and model of vehicles. The vehicle device may utilize the unique identifier to determine data identifying a year, a make, and a model of the vehicle by querying such a data store or service providing access to the data store. The vehicle device may utilize the data identifying the year, the make, and the model of the vehicle to determine non-standard parameter identifiers associated with the vehicle (e.g., non-standard parameter identifiers associated with an engine control module of the vehicle).

By generating the unique identifier of the vehicle and determining the non-standard parameter identifiers of the vehicle, the vehicle device may conserve computing resources, networking resources, and other resources that would otherwise have been consumed in utilizing third party databases, incorrectly identifying vehicles, determining incorrect non-standard PIDs based on incorrectly identified vehicles, performing an action based on the incorrectly non-standard PIDs, among other examples.

FIGS. 1A-1F are diagrams of an example 100 associated with identifying a vehicle based on messages received by a controller area network (CAN) bus of the vehicle. As shown in FIGS. 1A-1F, example 100 includes a vehicle 102, a plurality of vehicle devices 105 (collectively referred to as "vehicle devices 105" and individually referred to as "vehicle device 105"), a CAN bus 108 of the vehicle 102, and a server device 110. The vehicle 102 may include a car, a truck, a motorcycle, a bus, a boat, farm equipment, construction equipment, among other examples. In some examples, the vehicle 102 may include an autonomous vehicle, a semiautonomous vehicle, or a non-autonomous vehicle.

The vehicle devices 105 may include devices (e.g., telematics devices, vehicle tracking units, among other examples) that obtain (or capture) data from vehicles to which the vehicle devices 105 are connected. For example, the vehicle devices 105 may determine on-board diagnostics (OBD) parameter identifiers (PIDs) that are defined by the Society of Automotive Engineering (SAE) SAE J1979 standard (hereinafter "standard PIDs" or "standard parameter identifiers"). Additionally, or alternatively, the vehicle devices 105 may determine OBD PIDs that are not defined by the SAE J1979 standard (hereinafter "non-standard PIDs" or "non-standard parameter identifiers"). As an example, the non-standard PIDs of a vehicle may be defined by a manufacturer of the vehicle. The vehicle devices 105 may utilize standard PIDs and/or non-standard PIDs to obtain the data from the vehicles. In some examples, the vehicle devices 105 may removable and connectable to multiple ones of the vehicles. For example, a vehicle device 105, connected to one vehicle, may be disconnected from such vehicle and may be connected to another vehicle.

The CAN bus 108 may include a component (e.g., a vehicle bus) that enables wired and/or wireless communication among one or more components of the vehicle 102. The one or more components may include a plurality of electronic control units (e.g., an engine control module (ECM), a powertrain control module (PCM), a transmission control module (TCM), a brake control module (BCM or EBCM), among other examples), a plurality of sensor devices (e.g., an oxygen sensor device, a temperature sensor device, an air flow sensor device, among other examples), one or more actuators (e.g., a throttle actuator), one or more control devices (e.g., a fuel pressure control device, an injection pressure control device, among other examples), among other examples. The one or more components may transmit messages via the CAN bus 108. In some implementations, a vehicle device 105 may obtain parameters (e.g., data) associated with the standard PIDs and/or parameters (e.g., data) associated with the non-standard PIDs via the CAN bus 108 for diagnostic purposes.

The server device 110 may include a device or a collection of devices (e.g., associated with a cloud computing environment or a data center) that provides information identifying vehicles (e.g., years, makes, and models) to the vehicle devices 105. In some implementations, the server device 110 may receive parameters (e.g., associated with the standard PIDs and/or the non-standard PIDs) from the vehicle devices 105, use the parameters to determine information identifying the vehicles, and provide the information identifying the vehicles to the vehicle devices 105.

As shown in FIG. 1A, and by reference number 115, the server device 110 may receive unique identifiers of vehicles. For example, the server device 110 may receive the unique identifiers of the vehicles from the vehicle devices 105. As explained above, the vehicles may include cars, trucks, motorcycles, buses, boats, farm equipment, and construction equipment, among other examples. The vehicles may be associated with different years, makes, and models. For example, a first vehicle may be associated with a first year, a first make, and a first model; a second vehicle may be associated with a second year, a second make, and a second model; and so on. The vehicle devices 105 may be connected to the vehicles. For example, a first vehicle device 105 may be connected to the first vehicle, a second vehicle device 105 may be connected to the second vehicle, and so on. In some situations, a vehicle device 105 may be connected successively to multiple different vehicles. For example, a first vehicle device 105 may be connected to the first vehicle at a first time, may be connected to the second vehicle at a second time, and so on.

In some implementations, the server device 110 may receive the unique identifiers of the vehicles based on transmitting, to the vehicle devices 105, a unique identifier request for the unique identifiers of the vehicles. In some examples, the server device 110 may transmit the unique identifier request based on an event. For instance, the server device may receive a mapping request to generate vehicle data mapping the unique identifiers of the vehicles with years, makes, and models of the vehicles. The server device 110 may receive the mapping request from a device of an operator of the server device 110, from a device of a manufacturer of one or more of the devices, from a device of an owner of one or more of the devices, among other examples. Additionally, or alternatively, to transmitting the unique identifier request based on the event, the server device 110 may transmit the unique identifier request periodically (e.g., every month, every other month, and/or every three months, among other examples).

In some implementations, prior to transmitting the unique identifier request, the server device 110 may obtain, from a vehicle device data structure, information identifying the vehicle devices 105. In some examples, the vehicle device data structure may include a data structure (e.g., a database, a table, a linked list, among other examples) that stores the information identifying the vehicle devices 105 in association with information identifying the vehicles to which the vehicle devices 105 are connected. For instance, the vehicle device data structure may store information identifying the first vehicle device 105 in association with information identifying the first vehicle, store information identifying the second vehicle device 105 in association with information identifying the second vehicle, and so on. The information identifying the vehicle devices 105 may include names of the vehicle devices 105, serial numbers of the vehicle devices 105, model numbers of the vehicle devices 105, network addresses of the vehicle devices 105, information identifying locations of the vehicle devices 105, among other examples. The information identifying the vehicles may include information identifying the years, the makes, and the models of the vehicles.

In some implementations, prior to the server device 110 obtaining the information identifying the vehicle devices 105, the vehicle device data structure may be populated (e.g., by the server device 110) based on the vehicle devices 105 registering with the server device 110 (e.g., when the vehicle devices 105 are initially connected to the vehicles). The server device 110 may register the vehicle devices 105 using one or more of multiple different techniques. For example, with respect to registering using a first technique, assume that the server device 110 is associated with a fleet of vehicles that includes the first vehicle. Further assume that the server device 110 has caused the first vehicle device 105 to be delivered to a location of a first user (e.g., for the purpose of the first user connecting the first vehicle device 105 to the first vehicle).

In some examples, the server device 110 may transmit, to a first user device of the first user, an instruction message including an instruction to connect the first vehicle device 105 to the first vehicle. The instruction message may include the information identifying the first vehicle device 105 and the information identifying the first vehicle. In some implementations, based on transmitting the instruction message, the server device 110 may register the first vehicle device 105 and may store, in the vehicle device data structure, the information identifying the first vehicle device 105 in association with the information identifying the first vehicle.

In some implementations, the first user may transmit (e.g., using the first user device) a first connection message to the server device 110 after the first vehicle device 105 is connected to the first vehicle. The first connection message may include the information identifying the first vehicle device 105, the information identifying the first vehicle, and information indicating that the first vehicle device 105 is connected to the first vehicle. Based on receiving the first connection message, the server device 110 may register the first vehicle device 105 and may store, in the vehicle device data structure, the information identifying the first vehicle device 105 in association with the information identifying the first vehicle (previously transmitted to the first user device).

In some implementations, the first vehicle device 105 may be pre-configured to transmit a second connection message after being connected to a vehicle. In this regard, the first vehicle device 105 may transmit the second connection message, to the server device 110, after detecting a connection to the first vehicle. The second connection message may include the information identifying the first vehicle device 105 and information indicating that the first vehicle device 105 is connected to the first vehicle. Based on receiving the second connection message, the server device 110 may register the first vehicle device 105 as described above. The server device 110 may perform similar actions for one or more other vehicles in the fleet of vehicles.

With respect to registering the vehicle devices 105 using a second technique, for example, assume that the second vehicle device 105 has been acquired (e.g., purchased) by a second user for the purpose of performing diagnostics of vehicles, such as the second vehicle (e.g., the second vehicle device 105 has been acquired without any action by the server device 110). The second vehicle may be located at a repair facility, a home of the second user, a place of business of the second user, among other examples. Further assume that the second user desires to activate a policy for the second vehicle device 105 (e.g., activate a warranty policy, activate a technical support policy, among other examples). In this regard, the second user may transmit, using a second user device, a policy activation request to the server device 110. The policy activation request may include the information identifying the second vehicle device 105, the information identifying the second vehicle, an indication to activate the policy for the second vehicle device 105, and/or information indicating that the second vehicle device 105 is connected to the second vehicle.

The server device 110 may receive the policy activation request. Based on receiving the policy activation request, the server device 110 may register the second vehicle device 105 and may store, in the vehicle device data structure, the information identifying the second vehicle device 105 in association with the information identifying the second vehicle (unknown to the server device 110 prior to receiving the policy activation request).

The server device 110 may register one or more other vehicle devices 105 and populate the vehicle device data structure in a manner similar to the manner described above with respect to the first vehicle device 105 and/or the second vehicle device 105. In some implementations, the server device 110 may update the vehicle device data structure when the server device 110 receives an indication that a vehicle device 105 has been disconnected from a first particular vehicle and connected to a second particular vehicle. For example, the server device 110 may cause information identifying the vehicle device 105 (stored in the vehicle device data structure) to be associated with information identifying the second particular device (instead of being associated with information identifying the first particular device).

After obtaining the information identifying the vehicle devices 105 (as explained above), the server device 110 may transmit, to the vehicle devices 105, the unique identifier request for the unique identifiers of the vehicles. For example, the server device 110 may transmit the unique identifier request using the information identifying the vehicle devices 105. For instance, the server device 110 may transmit the unique identifier request to the network addresses of the vehicle devices 105. The unique identifier request may cause the vehicle devices 105 to generate the unique identifiers of the vehicles. For example, the first vehicle device 105 may generate a first unique identifier for the first vehicle, the second vehicle device 105 may generate a second unique identifier for the second vehicle, and so on. In addition, or alternatively, to generating the unique identifiers based on the unique identifier request, the vehicle devices 105 may be pre-configured to generate the unique identifiers of the vehicles periodically (e.g., every month, every three months, among other examples).

In some examples, a vehicle device 105 may generate a unique identifier (for a vehicle) based on messages received, by a CAN bus of the vehicle, from one or more components (of the vehicle) that are connected to the CAN bus. For example, the vehicle device 105 may generate the unique identifier (for the vehicle) based on addresses (of the one or more components) included in the messages, as described in more detail below. In some implementations, the vehicle device 105 may generate the unique identifier based on computing information indicating a manner (e.g., an algorithm) for generating the unique identifier.

In some examples, the vehicle device 105 may be pre-configured with the computing information. For instance, the computing information may be stored in one or more memories of the vehicle device 105. In some examples, the vehicle device 105 may receive the computing information from the server device 110. For example, the vehicle device 105 may receive the computing information as part of the unique identifier request (e.g., the computing information may be included in the unique identifier request). Alternatively, the vehicle device 105 may receive the computing information separate from the unique identifier request (e.g., the computing information may be received separate from the unique identifier request). In some examples, the vehicle device 105 may determine the computing information based on historical data (e.g., historical computing information).

The vehicle devices 105 may transmit the unique identifiers along with the information identifying the vehicle devices 105 to the server device 110. For example, the first vehicle 105 may transmit the first unique identifier of the first vehicle along with the information identifying the first vehicle device 105, the second vehicle 105 may transmit the second unique identifier of the second vehicle along with the information identifying the second vehicle device 105, and so on. The server device 110 may receive the unique identifiers and the information identifying the vehicle devices 105 from the vehicle devices 105.

In some implementations, the vehicles may be part of a group of vehicles (e.g., a fleet of vehicles). In this regard, the server device 110 may receive the unique identifiers and the information identifying the vehicle devices 105 from the vehicle devices 105 until the server device 110 has received the unique identifiers of a majority (or all) of vehicles of the group of vehicles. In some implementations, the server device 110 may receive the unique identifiers and the information identifying the vehicle devices 105 from the vehicle devices 105 during a period of time (e.g., six months, a year, among other examples). In some examples, the period of time may be defined by the operator of the server device 110.

The server device 110 may continuously receive the unique identifiers and the information identifying the vehicle devices 105 from the vehicle devices 105. The server device 110 may receive the unique identifiers when the vehicle devices 105 are first connected to vehicles and/or may receive the unique identifiers based on transmitting requests for unique identifiers to the vehicle devices 105. Based on the foregoing, in some implementations, the server device 110 may receive thousands, millions, or more unique identifiers. In some implementations, the server device 110 may utilize the unique identifiers, when mapped to the information identifying the vehicles (e.g., years, makes, and models of the vehicles), to assist in the management of fleets of vehicles (e.g., manage repair of the vehicles, manage maintenance of the vehicles, among other examples).

As shown in FIG. 1A, and by reference number 120, the server device 110 may provide vehicle data mapping the unique identifiers with years, makes, and models of the vehicles for storage. In some implementations, after receiving the unique identifiers and the information identifying the vehicle devices 105, the server device 110 may identify the information identifying the vehicles to which the vehicle devices 105 are connected in order to generate the vehicle data. In some examples, the server device 110 may perform a look-up of the vehicle device data structure using the information identifying the vehicle devices 105 in order to determine the information identifying the vehicles (e.g., years, makes, and models of the vehicles).

For instance, the server device 110 may perform a look-up of the vehicle device data structure using the information identifying the first vehicle device 105 in order to determine the information identifying the first vehicle (e.g., the first year, the first make, and the first model of the first vehicle), perform a look-up of the vehicle device data structure using the information identifying the second vehicle device 105 in order to determine the information identifying the second vehicle (e.g., the second year, the second make, and the second model of the second vehicle), and so on.

After determining the information identifying the vehicles, the server device 110 may generate the vehicle data mapping the unique identifiers of the vehicles with the information identifying the vehicles. For example, the vehicle data may include the first unique identifier of the first vehicle mapped with (or associated with) the information identifying the first vehicle, the second unique identifier of the second vehicle mapped with (or associated with) the information identifying the second vehicle, and so on. In some implementations, the vehicle data may include thousands, millions, or more unique identifiers mapped with the information identifying thousands, millions, or more vehicles (e.g., thousands, millions, or more years, makes, and models). In some implementations, the server device 110 may provide the vehicle data to a vehicle mapping data structure for storage. In other words, the server device 110 may populate the vehicle mapping data structure with the vehicle data.

The vehicle mapping data structure may include a data structure (e.g., a database, a table, a linked list, among other examples) that stores the unique identifiers of the vehicles in association with the information identifying the vehicles, in a manner similar to the manner described above. Additionally, or alternatively, to storing the vehicle data in the vehicle mapping data structure, the server device 110 may store the vehicle data in one or more memories of the server device 110.

Figure 1B:
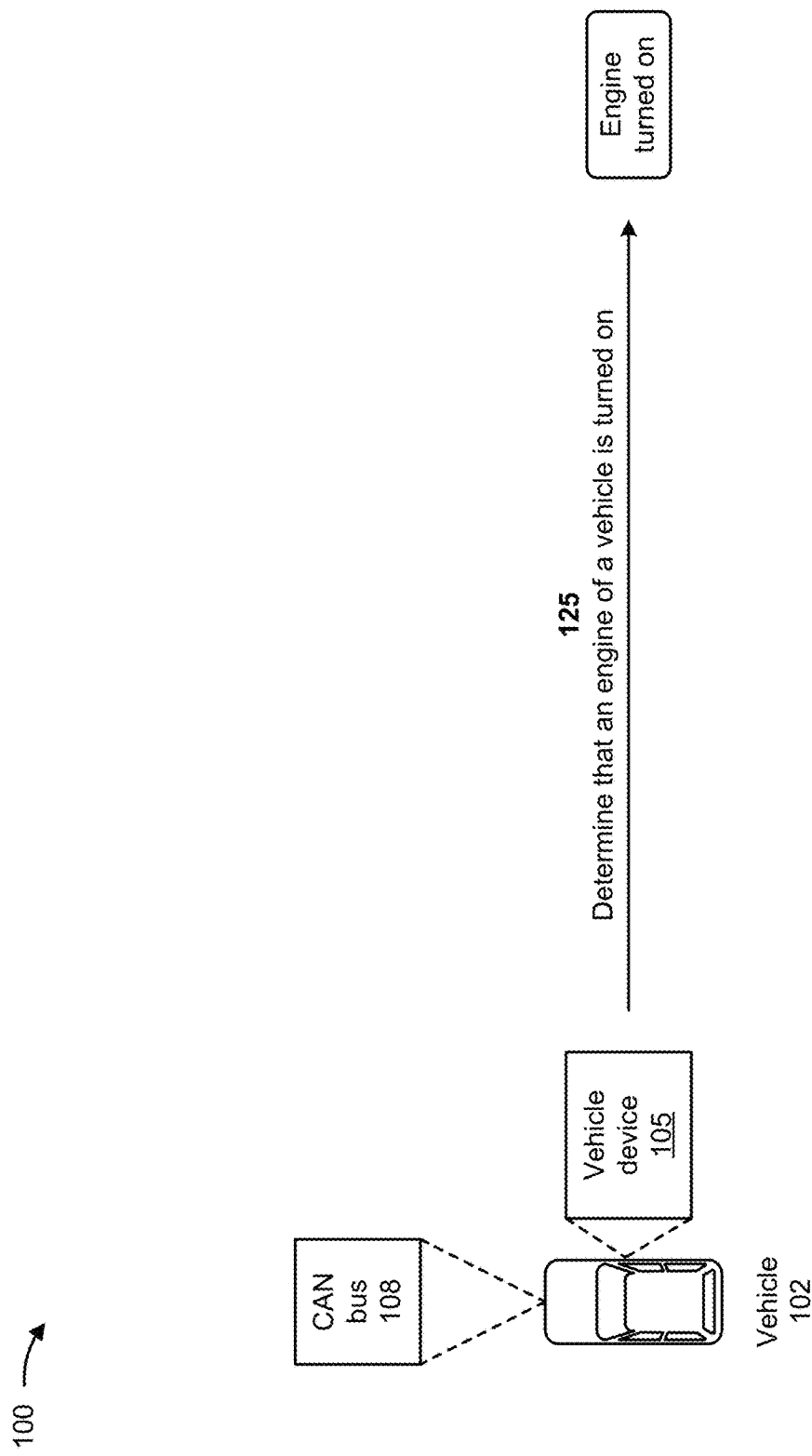

As shown in FIG. 1B, assume that, after populating the vehicle mapping data structure, a vehicle device 105 is connected to the vehicle 102. In some implementations, the vehicle device 105 may be one of the vehicle devices 105 described above in connection with reference number 115. Alternatively, the vehicle device 105 may be different than the vehicle devices 105 described above and may be newly deployed or configured by the server device 110 or newly acquired or configured by a user associated with the vehicle 102. Further assume that, after detecting a connection, the vehicle device 105 transmits (to the server device 110) a connection message including information identifying the vehicle device 105 and an indication that the vehicle device 105 has been connected to a vehicle (i.e., a vehicle of an unknown year, make, and model).

The server device 110 may validate the vehicle device 105 based on the connection message (e.g., based on the information identifying the vehicle device 105). Further assume that the vehicle 102 was not included in the vehicles described above in connection with reference number 115. Further assume that the vehicle mapping data structure stores a unique identifier in association with a year, a make, and a model of the vehicle 102. In some situations, the vehicle device 105 may have unsuccessfully attempted to obtain a vehicle identification number of the vehicle 102.

As shown in FIG. 1B, and by reference number 125, the vehicle device 105 may determine that an engine of a vehicle is turned on. In some implementations, the vehicle device 105 may receive a parameter request (e.g., from a user device of the user associated with the vehicle 102) to obtain parameters associated with non-standard parameter identifiers of the vehicle 102 and/or standard parameter identifiers of the vehicle 102. Based on receiving the parameter request, the vehicle device 105 may monitor an operation of the vehicle to determine whether the engine is turned on, in order to obtain the parameters. In some implementations, the vehicle device 105 may be pre-configured to obtain the parameters associated the non-standard parameter identifiers of the vehicle 102. Based on the pre-configuration, the vehicle device 105 may monitor the operation of the vehicle 102 to determine whether the engine is turned on, in order to obtain the parameters and without receiving a parameter request.

In some implementations, based on monitoring the operation of the vehicle, the vehicle device 105 may determine that the engine of the vehicle 102 is turned on. In some examples, the vehicle device 105 may receive information (e.g., a signal) from the vehicle 102. The information may indicate that the engine of the vehicle 102 is turned on. In some examples, the vehicle device 105 may receive the information from the ECM of the vehicle 102. In some instances, the information may include information identifying the ECM (e.g., a serial number of the ECM, a model number of the ECM, among other examples) and information regarding the engine. The information regarding the engine may include information indicating that the engine is turned on.

In some implementations, based on receiving the parameter request and/or based on the pre-configuration of the vehicle device 105, the vehicle device 105 may monitor the operation of the vehicle 102 to determine whether an electrical system of the vehicle 102 is turned on (in addition, or alternatively, to determining whether the engine is turned on). The electrical system may include components such as a battery, an alternator, a starter, among other examples. In some examples, the vehicle device 105 may receive, from one or more modules associated with the electrical system, information (e.g., one or more signals) indicating that the electrical system is turned on.

Figure 1C:
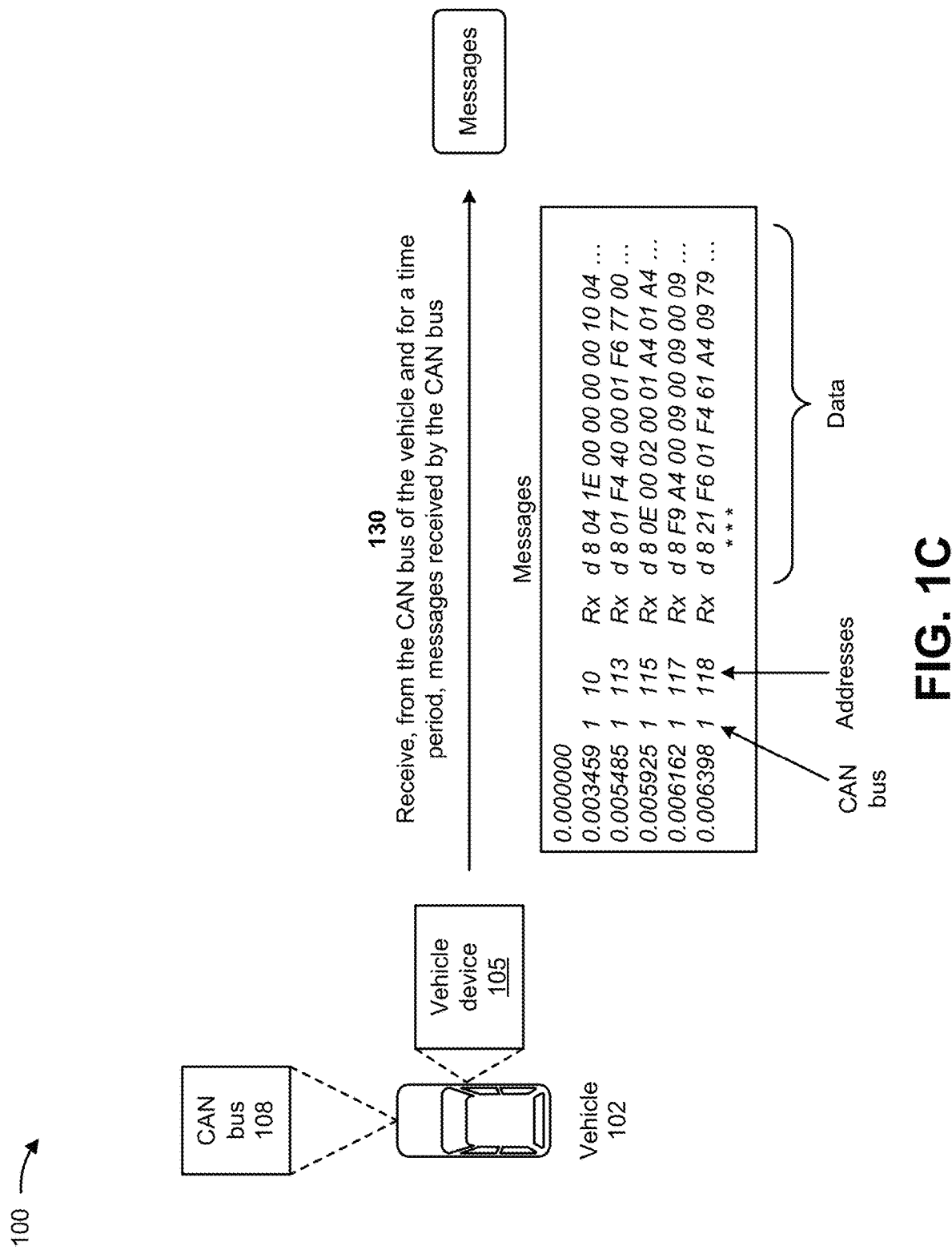

As shown in FIG. 1C, and by reference number 130, the vehicle device 105 may receive, from the CAN bus of the vehicle 102 and for a time period, messages received on the CAN bus. For example, based on determining that the engine is turned on and/or determining that the electrical system is turned on, the vehicle device 105 may transmit, to the CAN bus 108, a message access request for access to messages received on the CAN bus 108. Based on receiving the message access request, the CAN bus 108 may validate the vehicle device 105 and may grant the vehicle device 105 access to the messages received on the CAN bus 108. In some examples, after being granted access by the CAN bus 108, the vehicle device 105 may scan the CAN bus 108 to obtain the messages received on the CAN bus 108. In some instances, the vehicle device 105 may scan the CAN bus 108 to obtain the messages during the time period and stop scanning the CAN bus 108 when the time period expires.

In some examples, the messages received on the CAN bus 108 may be part of one or more logs, of the CAN bus 108, generated during the time period. In this regard, the vehicle device 105 may obtain access to the one or more logs and read the messages included in the one or more logs during the time period. In some implementations, the parameter request may include information identifying the time period. In this regard, the vehicle device 105 may determine the time period based on the parameter request. Additionally, or alternatively, the vehicle device 105 may determine the time period based on historical data (e.g., historical time periods, historical parameter requests, among other examples). Additionally, or alternatively, the vehicle device 105 may be pre-configured with the information identifying the time period. For example, the information identifying the time period may be stored in a memory of the vehicle device 105.

In some examples, the messages (accessed by the vehicle device 105) may include messages received, on the CAN bus 108 (e.g., during the time period), from the one or more components connected to the CAN bus 108 and may include information identifying the one or more components (e.g., addresses, of the one or more components, associated with the CAN bus 108). As an example, a first message may include information identifying the CAN bus 108, information identifying a first address of a first component of the vehicle 102, and first data of the first component; a second message may include information identifying the CAN bus 108, information identifying a second address of a second component of the vehicle 102, and second data of the second component; and so on. In some examples, the messages (of the CAN bus 108) may include multiple messages from a same component and, accordingly, include multiple instances of a same address of such component. In other words, the messages (of the CAN bus 108) may include duplicate addresses.

In some implementations, the vehicle device 105 may wait for a threshold amount of time (after determining that the engine is turned on and/or determining that the electrical system is turned on) prior to transmitting the message access request. In some examples, the vehicle device 105 may be pre-configured to wait for the threshold amount of time prior to transmitting the request for the messages. For instance, information identifying the threshold amount of time may be stored in a memory of the vehicle device 105. In some examples, the vehicle device 105 may receive the information identifying the threshold amount of time as part of receiving the parameter request (e.g., the information identifying the threshold amount of time may be included in the parameter request).

Figure 1D:
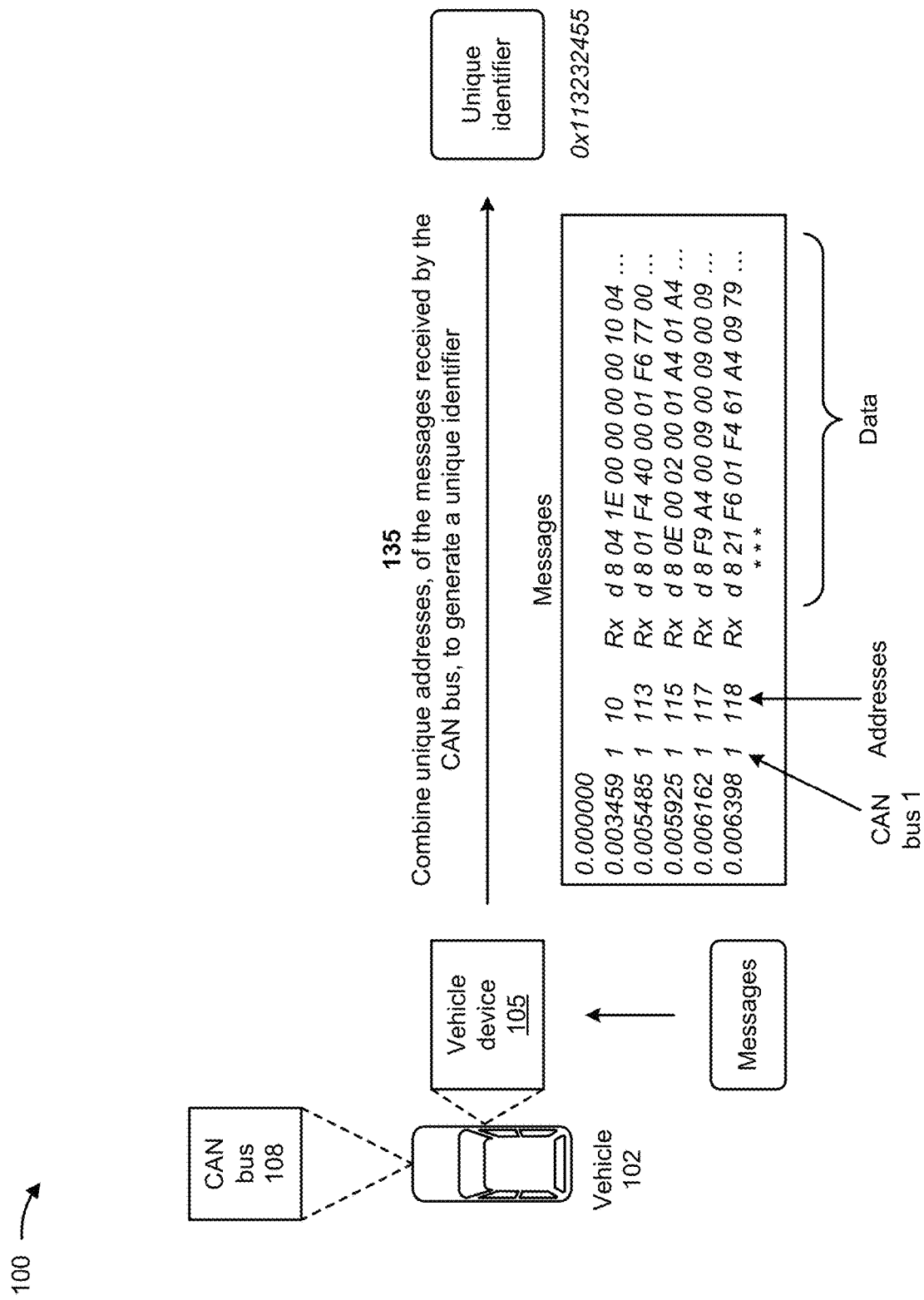

As shown in FIG. 1D, and by reference number 135, the vehicle device 105 may combine unique addresses, of the messages received on the CAN bus 108, to generate a unique identifier. For example, the vehicle device 105 may combine the unique addresses to generate the unique identifier for the vehicle 102. In some examples, the messages may include multiple messages from a same component and, accordingly, include multiple instances of an address of such component (e.g., include duplicate addresses). In some instances, an address, recurring in one or more patterns, may form a signature for this particular type of vehicle, and can be used for identification after storing in the data structure. In this regard, the signature may act as the unique identifier.

In some implementations, the vehicle device 105 may analyze the messages to identify duplicate addresses. The vehicle device 105 may remove messages associated with the duplicate addresses, from the messages, to obtain messages associated with the unique addresses. By removing the messages associated with the duplicate addresses, the vehicle device 105 may conserve computing resources, network resources, and/or storage resources that would have otherwise been consumed to determine the unique identifier using the duplicate addresses.

In some implementations, the vehicle device 105 may combine a first unique address with a second unique address, and so on. A unique address may include alphanumerical characters. For example, the first unique address may include first alphanumerical characters, the second unique address may include second alphanumerical characters, and so on.

In some implementations, the unique addresses may include numerical characters (e.g., numbers). In such instances, when combining the unique addresses, the vehicle device 105 may add the numerical characters (of the unique addresses) to generate the unique identifier. In some examples, the unique identifier may include a hexadecimal value. Combining the unique addresses using addition is merely provided as an example. In practice, the unique addresses may be combined using one or more other mathematical operations (e.g., subtraction, multiplication, or division), combined using a combination of mathematical operations (e.g., a combination of subtraction, multiplication, division, and/or addition), combined using concatenation (e.g., string concatenation), among other examples.

Figure 1E:
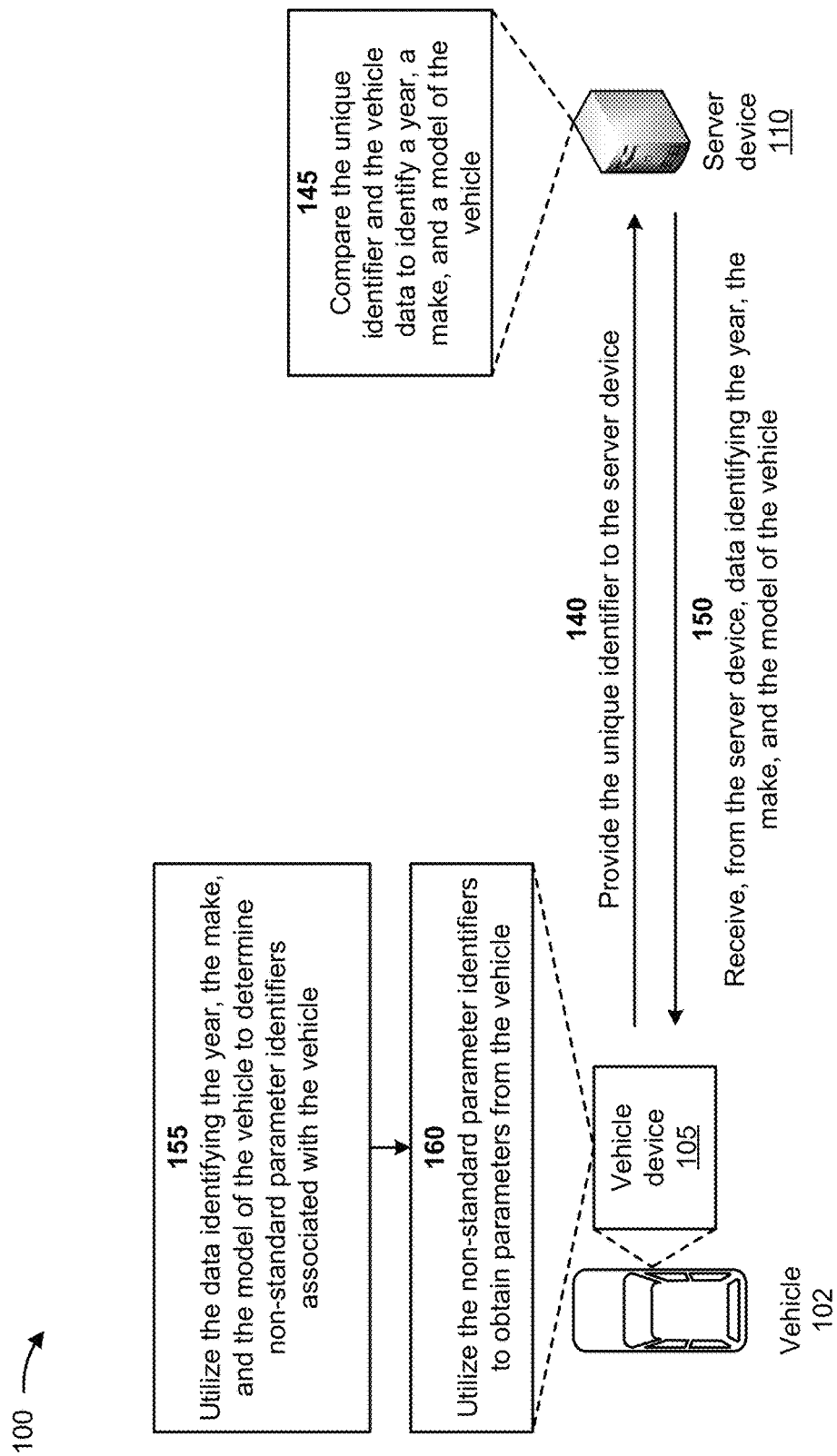

As shown in FIG. 1E, and by reference number 140, the vehicle device 105 may provide the unique identifier to the server device 110. In some implementations, the vehicle device 105 may transmit (e.g., to the server device 110) a vehicle identification request for information identifying the vehicle 102 (e.g., information identifying a year, a make, and a model of the vehicle 102). The vehicle identification request may include the unique identifier of the vehicle 102. In some implementations, the vehicle identification request may include information identifying the vehicle device 105 (e.g., a name, a serial number, a model number, a network address, information identifying a location, among other examples).

As shown in FIG. 1E, and by reference number 145, the server device 110 may compare the unique identifier and the vehicle data to identify a year, a make, and a model of the vehicle 102. For example, the server device 110 may receive the vehicle identification request and determine the information identifying the year, the make, and the model of the vehicle 102 based on receiving the vehicle identification request. In some implementations, the server device 110 may respond to vehicle identification requests from vehicle devices 105 after the server device 110 has received unique identifiers for a threshold number of years, makes, and models (e.g., to increase a likelihood of the server device 110 identifying years, makes, and models associated with the vehicle identification requests). In some examples, the threshold number may be defined by the operator of the server device 110. In some implementations, the server device 110 may perform a look-up of the vehicle mapping data structure, using the unique identifier of the vehicle 102, to identify the year, the make, and the model associated with the unique identifier stored in the vehicle mapping data structure.

In some implementations, the server device 110 may compare the unique identifier and the vehicle data stored by the one or more memories of the server device 110. As explained above, the vehicle data may map unique identifiers of vehicles with years, makes, and models of the vehicles. Based on the comparison, the server device 110 may identify the year, the make, and the model associated with the unique identifier included in the vehicle data. The server device 110 may transmit, to the vehicle 102, data identifying the year, the make, and the model of the vehicle 102 (e.g., identified based on the comparison or based on performing the look-up).

In some implementations, the server device 110 may generate the unique identifier (instead of receiving the unique identifier from the vehicle device 105) and may identify the year, the make, and the model associated with the unique identifier, as described above. For example, the server device 110 may receive, from the vehicle device 105, the messages received on the CAN bus 108 and may generate the unique identifier based on the messages, in a manner similar to the manner described above with respect to the vehicle device 105 generating the unique identifier. In some implementations, the server device 110 may receive the identifiers (included in the unique addresses) from the vehicle device 105 (instead of receiving the messages) and the server device 110 may generate the unique identifier in a manner similar to the manner described above. The server device 110 may identify the year, the make, and the model associated with the unique identifier, as described above.

As shown in FIG. 1E, and by reference number 150, the vehicle device 105 may receive, from the server device 110, data identifying the year, the make, and the model of the vehicle 102. For example, based on transmitting the vehicle identification request, the vehicle device 105 may receive, from the server device 110, the data identifying the year, the make, and the model of the vehicle 102.

As shown in FIG. 1E, and by reference number 155, the vehicle device 105 may utilize the data identifying the year, the make, and the model of the vehicle 102 to determine non-standard parameter identifiers associated with the vehicle 102. In some implementations, the vehicle device 105 may store, in one or more memories of the vehicle device 105, non-standard parameter identifiers in association with years, makes, and models of different vehicles. For example, the one or more memories of the vehicle device 105 may store first non-standard parameter identifiers in association with a combination of a first year, a first make, and a first model (e.g., of a first vehicle); store second non-standard parameter identifiers in association with a combination of a second year, a second make, and a second model (e.g., of a second vehicle); and so on.

In some implementations, the vehicle device 105 may use the data identifying the year, the make, and the model of the vehicle 102 to perform a look-up of the one or more memories. Based on the look-up of the one or more memories, the vehicle device 105 may determine (or identify) non-standard parameter identifiers associated with the year, the make, and the model of the vehicle 102. The non-standard parameter identifiers (associated with the year, the make, and the model of the vehicle 102) may include non-standard parameter identifiers associated with the electronic control units of the vehicle 102, such as non-standard parameter identifiers associated with the ECM, non-standard parameter identifiers associated with the PCM, non-standard parameter identifiers associated with the TCM, non-standard parameter identifiers associated with the BCM, among other examples.

In some implementations, when receiving the data identifying the year, the make, and the model of the vehicle 102 from the server device 110, the vehicle device 105 may receive the non-standard parameter identifiers associated with the year, the make, and the model (of the vehicle 102) along with the data identifying the year, the make, and the model of the vehicle 102. In such instances, the vehicle device 105 may not perform the look-up to determine the non-standard parameter identifiers.

As shown in FIG. 1E, and by reference 160 number, the vehicle device 105 may utilize the non-standard parameter identifiers to obtain parameters from the vehicle 102. For example, based on determining or receiving the non-standard parameter identifiers, the vehicle device 105 may transmit a parameter request (e.g., a parameter identifier query), via the CAN bus 108, to obtain parameters associated with one or more components of the vehicle 102 (e.g., one or more of the electronic control units of the vehicle 102). The parameter request may include one or more of the non-standard parameter identifiers. The parameters associated with the one or more components may include data generated by the one or more components. In some examples, the vehicle device 105 may transmit the parameter request to the ECM (utilizing the non-standard parameter identifiers associated with the ECM) to obtain parameters associated with the engine of the vehicle 102.

Additionally, or alternatively, the vehicle device 105 may transmit the parameter request to the PCM (utilizing the non-standard parameter identifiers associated with the PCM) to obtain parameters associated with a powertrain of the vehicle 102, transmit the parameter request to the TCM (utilizing the non-standard parameter identifiers associated with the TCM) to obtain parameters associated with a transmission of the vehicle 102, and so on.

Based on transmitting the parameter request to the one or more components, the vehicle device 105 may receive, via the CAN bus 108, one or more messages from the one or more components. The one or more messages may include the parameters from the vehicle 102. For example, the vehicle device 105 may receive a message (from the ECM) that includes the parameters associated with the engine, receive a message (from the PCM) that includes the parameters associated with the powertrain, and so on.

Figure 1F:
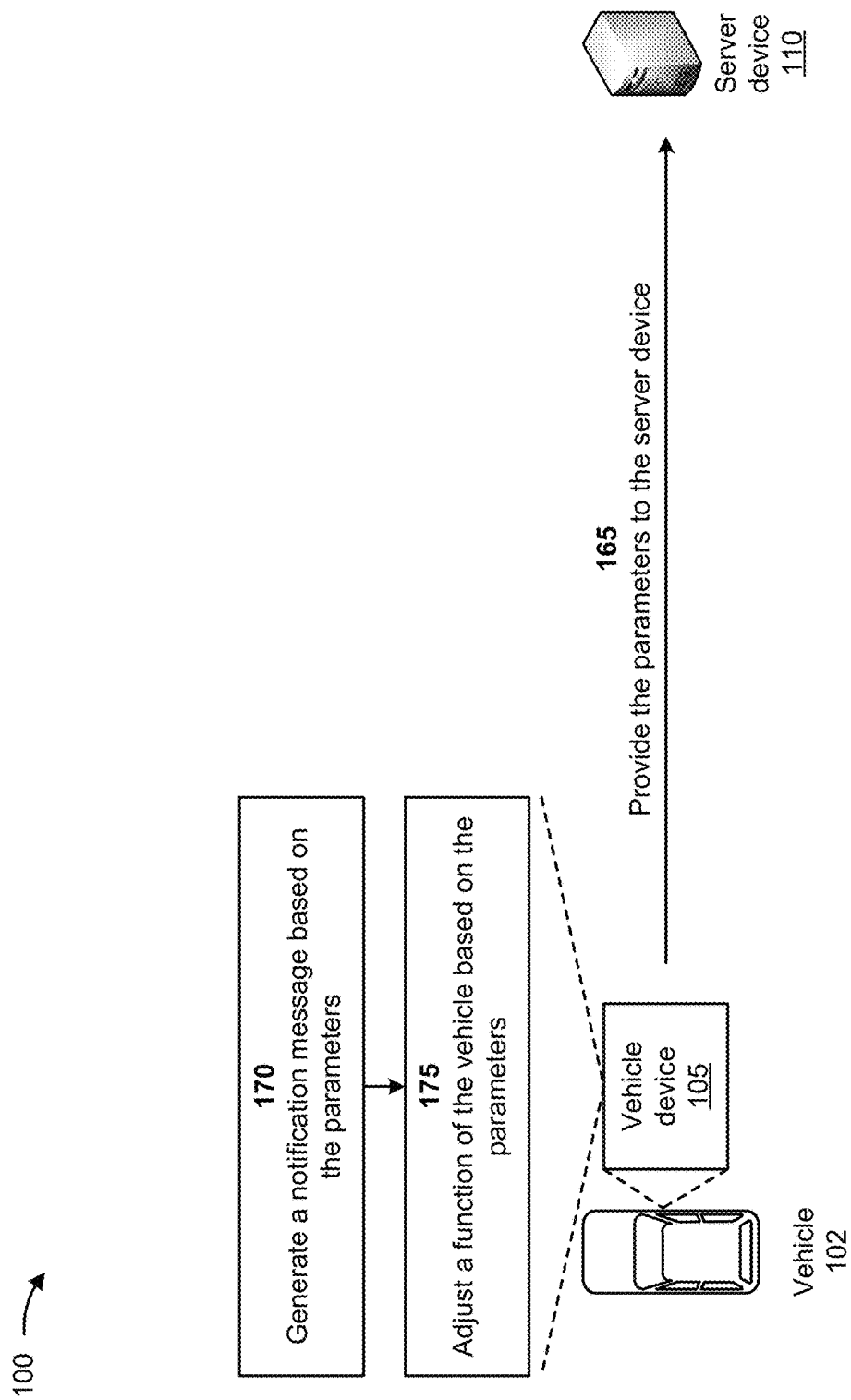

As shown in FIG. 1F, and by reference number 165, the vehicle device 105 may provide the parameters to the server device 110. For example, the vehicle device 105 may provide the parameters to the server device 110 to notify the server device 110 of a status of components of the vehicle 102 (e.g., a status of the engine, a status of the powertrain, a status of the transmission, a status of the brake system, a status of the electrical system, among other examples). In some examples, the status of the components may include a health status of the components.

In some implementations, the vehicle device 105 may provide the parameters to the server device 110 to cause the server device 110 to schedule a maintenance of the vehicle 102 and/or schedule a maintenance of one or more other vehicles with a same year, make, and model as the vehicle 102. Additionally, or alternatively, the vehicle device 105 may provide the parameters to the server device 110 to cause the server device 110 to cause maintenance of the vehicle 102 to be performed and/or cause maintenance of one or more other vehicles with a same year, make, and model as the vehicle 102 to be performed.

For example, the server device 110 may transmit a maintenance request to a device of a maintenance personnel to cause the maintenance personnel to travel to a location of the vehicle 102 to perform the maintenance of the vehicle 102. The maintenance request may include information identifying a location of the vehicle 102 (e.g., the information identifying the location of the vehicle device 105 connected to the vehicle 102), the information identifying the vehicle 102 (e.g., the year, the make, and the model), and the parameters. Additionally, or alternatively, to transmitting the maintenance request to the device of the maintenance personnel, the server device 110 may transmit the maintenance request to an autonomous maintenance device to cause the autonomous maintenance device to navigate to the location of the vehicle 102 to perform the maintenance of the vehicle 102.

In some implementations, the vehicle device 105 may provide the parameters to the server device 110 to cause the server device 110 to schedule a repair of the vehicle 102 and/or schedule a repair of one or more other vehicles with a same year, make, and model as the vehicle 102. Additionally, or alternatively, the vehicle device 105 may provide the parameters to the server device 110 to cause the server device 110 to cause a repair of the vehicle 102 to be performed and/or cause a repair of one or more other vehicles with a same year, make, and model as the vehicle 102 to be performed.

For example, the server device 110 may transmit a repair request to a device of a repair personnel to cause the repair personnel to travel to the location of the vehicle 102 to perform the repair of the vehicle 102. The repair request may include the information identifying the location of the vehicle 102, the information identifying the vehicle 102, and the parameters. Additionally, or alternatively, to transmitting the repair request to the device of the repair personnel, the server device 110 may transmit the maintenance request to an autonomous repair device to cause the autonomous repair device to navigate to the location of the vehicle 102 to perform the repair of the vehicle 102.

In some implementations, the vehicle device 105 may provide the parameters to the server device 110 to cause the server device 110 to transmit a report to a manufacturer of the vehicle 102 to cause the manufacturer to adjust a configuration of vehicles with a same year, make, and model as the vehicle 102 (e.g., to cause the manufacturer to issue one or more recalls). Additionally, or alternatively, the vehicle device 105 may provide the parameters to the server device 110 to cause the server device 110 to update software of the vehicle 102 and/or update software of one or more other vehicles with a same year, make, and model as the vehicle 102. Additionally, or alternatively, the vehicle device 105 may provide the parameters to the server device 110 to cause an adjustment of one or more of the components of the vehicle 102. As an example, the server device 110 may cause an adjustment of an operation of the engine of the vehicle 102 based on the parameters. For instance, the server device 110 may cause an adjustment of a configuration of the engine (e.g., to adjust a fuel consumption of the vehicle 102).

As shown in FIG. 1F, and by reference number 170, the vehicle device 105 may generate a notification message based on the parameters. In some implementations, the notification message may include information identifying the status of components of the vehicle 102. Additionally, or alternatively, the notification message may include information indicating whether the components require maintenance, information identifying a first option to cause the vehicle 102 to navigate to a maintenance facility, information identifying a second option to transmit the maintenance request to the device of the maintenance personnel, and/or a third option to transmit the maintenance request to the autonomous maintenance device.

Additionally, or alternatively, the notification message may include information indicating whether the components require repair, information identifying a fourth option to cause the vehicle 102 to navigate to a repair facility, information identifying a fifth option to transmit the repair request to the device of the repair personnel, and/or information identifying a sixth option to transmit the repair request to the autonomous repair device. In some implementations, the vehicle device 105 may provide (for display) the notification message to a user device of the user associated with the vehicle 102 (e.g., a driver of the vehicle 102, an owner of the vehicle 102, a passenger of the vehicle 102, among other examples). Additionally, or alternatively, the vehicle device 105 may provide the notification to the vehicle 102 for display via a display of the vehicle 102.

As shown in FIG. 1F, and by reference number 175, the vehicle device 105 may cause an adjustment of an operation of the vehicle 102 based on the parameters. In some implementations, the vehicle device 105 may perform one or more of the actions described above with respect to reference number 165 to cause an adjustment of the operation of the vehicle 102. Additionally, or alternatively, the vehicle device 105 may provide the notification message for display via a display of the vehicle device 105 and/or the vehicle 102 (e.g., in a manner similar to the manner described above with respect to reference number 170).

By generating the unique identifier as described above, the vehicle device 105 may conserve computing resources, networking resources, and other resources that would otherwise have been consumed in utilizing third party databases, incorrectly identifying vehicles, determining incorrect non-standard PIDs based on incorrectly identified vehicles, performing an action based on the incorrectly non-standard PIDs, among other examples.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
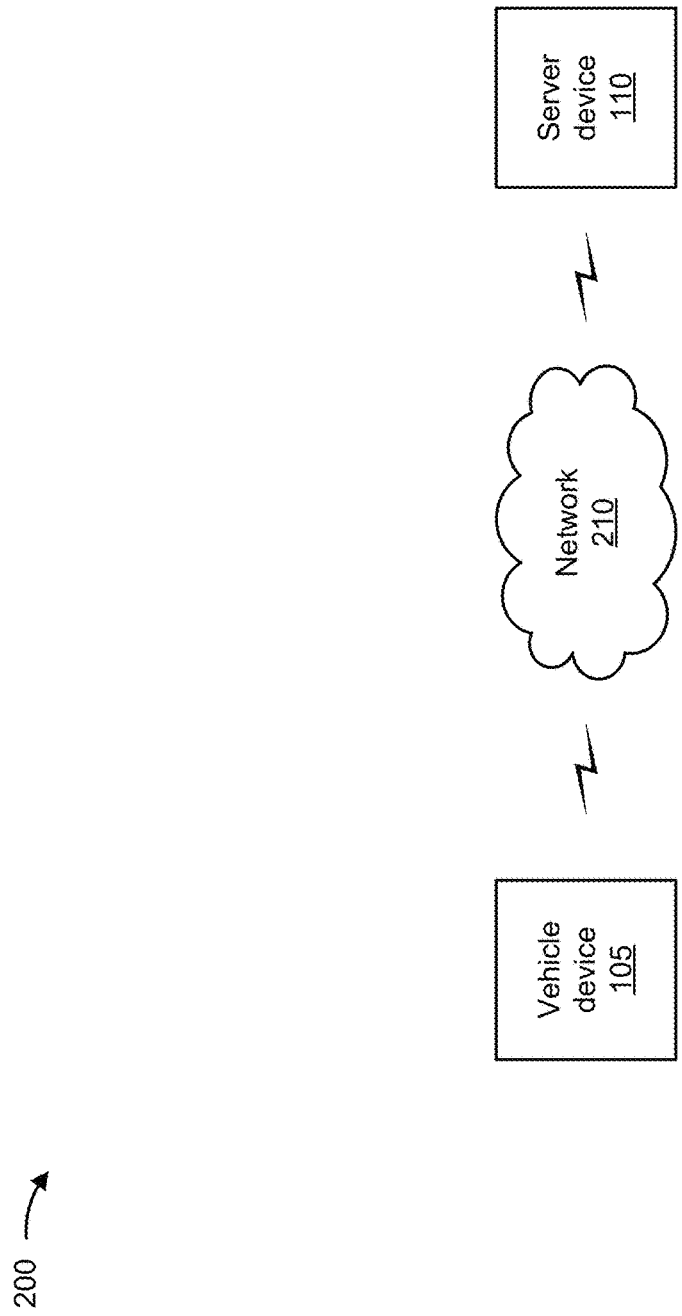
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a vehicle device 105, a server device 110, and a network 210. Devices of environment 200 may interconnect via wired connections, wireless connections, or a combination of wired and wireless connections.

The vehicle device 105 includes devices capable of receiving, generating, storing, processing, and/or providing information, as described elsewhere herein. The vehicle device 105 may include a communication device and/or a computing device. For example, the vehicle device 105 may include a telematics device, a video camera, an inertial measurement unit, a three-axis accelerometer, a gyroscope, a global positioning system (GPS) device, an on-board diagnostics (OBD) device, a vehicle tracking unit, an electronic control unit (ECU), among other examples.

Server device 110 includes one or more devices capable of receiving, generating, storing, processing, providing, and/or routing information, as described elsewhere herein. Server device 110 may include a communication device and/or a computing device. For example, the server device 110 may include a server, such as an application server, a client server, a web server, core network entity, radio access network entity, a database server, a host server, a proxy server, a virtual server (e.g., executing on computing hardware), or a server in a cloud computing system. In some implementations, server device 110 includes computing hardware used in a cloud computing environment.

Network 210 includes one or more wired and/or wireless networks. For example, network 210 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. Network 210 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
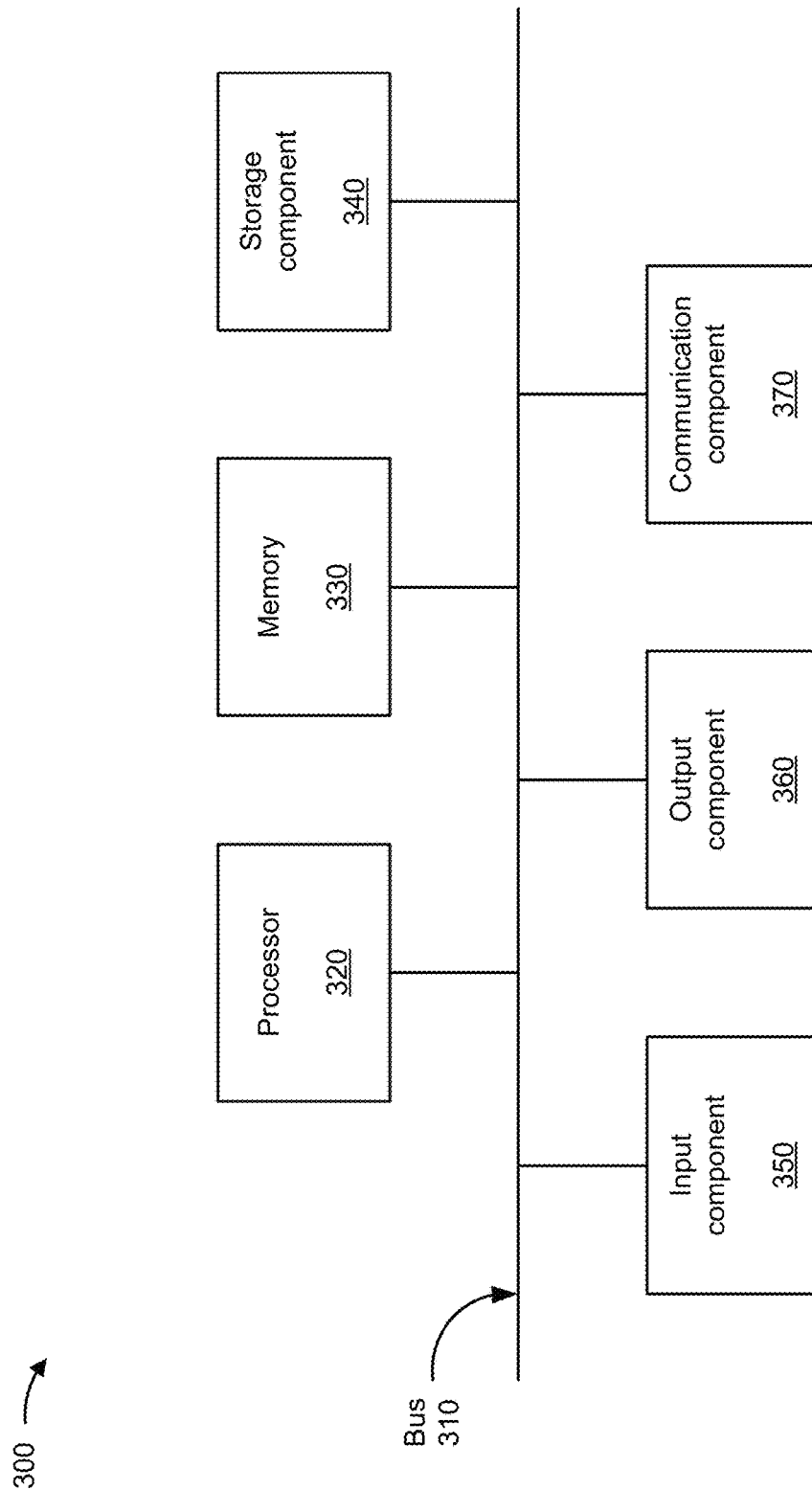
FIG. 3 is a diagram of example components of one or more devices of FIG. 2.

FIG. 3 is a diagram of example components of one or more devices of FIG. 2. The components may be components of a device 300, which may correspond to the vehicle device 105 and/or the server device 110. In some implementations, the vehicle device 105 and/or the server device 110 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
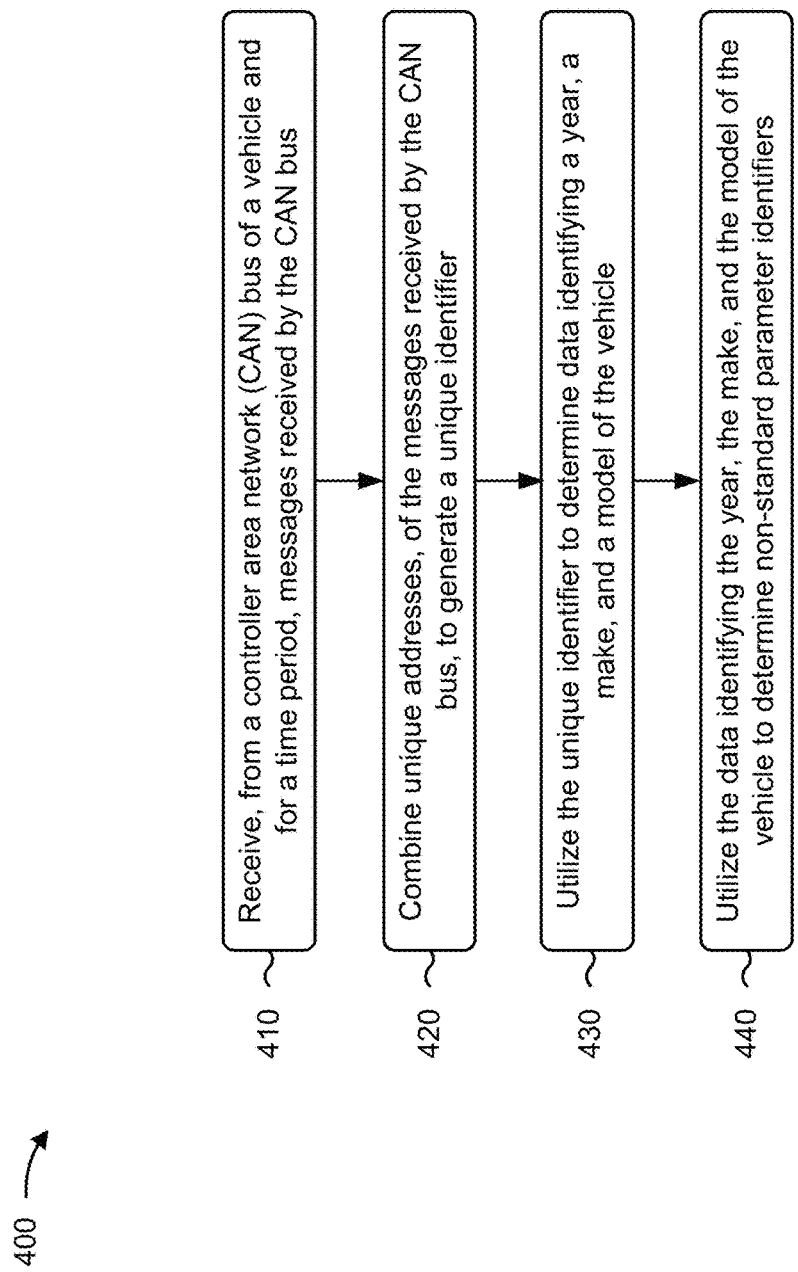
FIG. 4 is a flowchart of an example process associated with identifying a vehicle based on messages received by a CAN bus of the vehicle.

FIG. 4 is a flowchart of an example process 400 associated with identifying a vehicle based on messages received by a CAN bus of the vehicle. In some implementations, one or more process blocks of FIG. 4 may be performed by a vehicle device (e.g., the vehicle device 105). In some implementations, one or more process blocks of FIG. 4 may be performed by another device or a group of devices separate from or including the vehicle device, such a server device (e.g., the server device 110). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving, from a controller area network (CAN) bus of a vehicle and for a time period, messages received by the CAN bus after an engine of the vehicle is turned on (block 410). For example, the vehicle device may receive, from a controller area network (CAN) bus of a vehicle and for a time period, messages received by the CAN bus after an engine of the vehicle is turned on, as described above. In some implementations, the messages received by the CAN bus are included in logs captured by the CAN bus for the time period. In some implementations, the vehicle device includes a vehicle tracking unit.

As further shown in FIG. 4, process 400 may include combining identifiers provided in unique addresses, of the messages received by the CAN bus, to generate a unique identifier (block 420). For example, the vehicle device may combine identifiers provided in unique addresses, of the messages received by the CAN bus, to generate a unique identifier, as described above. In some implementations, process 400 includes identifying duplicate addresses of the messages received by the CAN bus, and removing the duplicate addresses, from the messages, to determine the unique addresses of the messages received by the CAN bus.

As further shown in FIG. 4, process 400 may include utilizing the unique identifier to determine data identifying a year, a make, and a model of the vehicle (block 430). For example, the vehicle device may utilize the unique identifier to determine data identifying a year, a make, and a model of the vehicle, as described above.

In some implementations, utilizing the unique identifier to determine the data identifying the year, the make, and the model of the vehicle includes comparing the unique identifier with vehicle data to identify the data identifying the year, the make, and the model of the vehicle, wherein the vehicle data includes data mapping unique identifiers with years, makes, and models of different vehicles. In some implementations, utilizing the unique identifier to determine the data identifying the year, the make, and the model of the vehicle includes providing the unique identifier to a server device that determines the data identifying the year, the make, and the model of the vehicle; and receiving the data identifying the year, the make, and the model of the vehicle from the server device based on providing the unique identifier to the server device.

As further shown in FIG. 4, process 400 may include utilizing the data identifying the year, the make, and the model of the vehicle to determine non-standard parameter identifiers associated with an engine control module of the vehicle (block 440). For example, the vehicle device may utilize the data identifying the year, the make, and the model of the vehicle to determine non-standard parameter identifiers associated with an engine control module of the vehicle, as described above.

In implementations, the non-standard parameter identifiers include codes used to request data from the vehicle. In some implementations, process 400 includes utilizing the non-standard parameter identifiers to obtain parameters from the vehicle, and providing the parameters to the server device. In some implementations, process 400 includes utilizing the non-standard parameter identifiers to obtain parameters from the vehicle, and performing one or more actions based on the parameters.

In some implementations, performing the one or more actions based on the parameters includes generating a notification based on the parameters; causing an adjustment of an operation of the vehicle based on the parameters; adjusting an operation of the engine of the vehicle based on the parameters; or providing the parameters to a server device or a client device associated with a driver of the vehicle.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a vehicle device, from a controller area network (CAN) bus of a vehicle, and for a time period, messages received by the CAN bus after an engine of the vehicle is turned on;
   combining, by the vehicle device, unique addresses associated with one or more vehicle systems of the vehicle, of the messages received by the CAN bus, to generate a unique identifier;
   utilizing, by the vehicle device, the unique identifier to determine data identifying a year, a make, and a model of the vehicle; and
   determining, by the vehicle device, non-standard parameter identifiers from an engine control module of the vehicle utilizing an association between the non-standard parameter identifiers and the year, the make, and the model of the vehicle.

2. The method of claim 1, wherein utilizing the unique identifier to determine the data identifying the year, the make, and the model of the vehicle comprises:
   comparing the unique identifier with vehicle data to identify the data identifying the year, the make, and the model of the vehicle,
     wherein the vehicle data includes data mapping unique identifiers with years, makes, and models of different vehicles.

3. The method of claim 1, wherein utilizing the unique identifier to determine the data identifying the year, the make, and the model of the vehicle comprises:
   providing the unique identifier to a server device that determines the data identifying the year, the make, and the model of the vehicle; and
   receiving the data identifying the year, the make, and the model of the vehicle from the server device based on providing the unique identifier to the server device.

4. The method of claim 3, further comprising:
   utilizing the non-standard parameter identifiers to obtain parameters from the vehicle; and
   providing the parameters to the server device.

5. The method of claim 1, further comprising:
   utilizing the non-standard parameter identifiers to obtain parameters from the vehicle; and
   performing one or more actions based on the parameters.

6. The method of claim 5, wherein performing the one or more actions based on the parameters comprises one or more of:
   generating a notification based on the parameters;
   causing an adjustment of an operation of the vehicle based on the parameters;
   causing an adjustment of an operation of the engine of the vehicle based on the parameters; or
   providing the parameters to a server device or a client device associated with a driver of the vehicle.

7. The method of claim 1, wherein the messages received by the CAN bus are included in logs captured by the CAN bus for the time period.

8. A vehicle device, comprising:
   one or more processors configured to:
     receive, from a controller area network (CAN) bus of a vehicle and for a time period, messages received by the CAN bus after one or more components of the vehicle are turned on;
     combine unique addresses associated with one or more vehicle systems of the vehicle, of the messages received by the CAN bus, to generate a unique identifier;
     utilize the unique identifier to determine data identifying a year, a make, and a model of the vehicle;
     determine non-standard parameter identifiers associated with one or more modules of the vehicle utilizing an association between the non-standard parameter identifiers and the year, the make, and the model of the vehicle;
     utilize the non-standard parameter identifiers to obtain parameters from the vehicle; and
     perform one or more actions based on the parameters.

9. The vehicle device of claim 8, wherein the one or more processors are further configured to:
   identify duplicate addresses of the messages received by the CAN bus; and
   remove the duplicate addresses, from the messages, to determine the unique addresses of the messages received by the CAN bus.

10. The vehicle device of claim 8, wherein the vehicle device includes a vehicle tracking unit.

11. The vehicle device of claim 8, wherein the non-standard parameter identifiers include codes used to request data from the vehicle.

12. The vehicle device of claim 8, wherein the one or more processors, when combining the unique addresses, of the messages received by the CAN bus, to generate the unique identifier, are configured to:
   identify duplicate addresses of the messages received by the CAN bus;
   remove the duplicate addresses, from the messages, to determine the unique addresses of the messages received by the CAN bus; and
   combine the unique addresses to generate the unique identifier.

13. The vehicle device of claim 8, wherein the messages received by the CAN bus are included in logs captured by the CAN bus for the time period.

14. The vehicle device of claim 8, wherein the one or more processors, when performing the one or more actions based on the parameters, are configured to:
   provide the parameters to a user device associated with a driver of the vehicle.

15. A non-transitory computer-readable medium storing a set of instructions, the set of instructions comprising:
   one or more instructions that, when executed by one or more processors of a vehicle device, cause the vehicle device to:
     receive, from a controller area network (CAN) bus of a vehicle and for a time period, messages received by the CAN bus after one or more components of the vehicle are turned on;
     combine unique addresses associated with one or more vehicle systems of the vehicle, of the messages received by the CAN bus, to generate a unique identifier;
     utilize the unique identifier to determine data identifying a year, a make, and a model of the vehicle;
     determine non-standard parameter identifiers associated with one or more control modules of the vehicle utilizing an association between the non-standard parameter identifiers and the year, the make, and the model of the vehicle;

obtain parameters from the vehicle based on the non-standard parameter identifiers; and perform one or more actions based on the parameters.

16. The non-transitory computer-readable medium of claim 15, wherein the one or more instructions, that cause the vehicle device to utilize the unique identifier to determine the data identifying the year, the make, and the model of the vehicle, cause the vehicle device to:

compare the unique identifier and vehicle data to identify the data identifying the year, the make, and the model of the vehicle, wherein the vehicle data includes data mapping unique identifiers with years, makes, and models of different vehicles.

17. The non-transitory computer-readable medium of claim 15, wherein the one or more instructions, that cause the vehicle device to utilize the unique identifier to determine the data identifying the year, the make, and the model of the vehicle, cause the vehicle device to:

provide the unique identifier to a server device that determines the data identifying the year, the make, and the model of the vehicle; and receive the data identifying the year, the make, and the model of the vehicle from the server device based on providing the unique identifier to the server device.

18. The non-transitory computer-readable medium of claim 15, wherein the one or more instructions, that cause the vehicle device to perform the one or more actions based on the parameters, cause the vehicle device to:

generate a notification based on the parameters;

cause an adjustment of an operation of the vehicle based on the parameters;

cause an adjustment of an operation of an engine of the vehicle based on the parameters; or provide the parameters to a server device.

19. The non-transitory computer-readable medium of claim 15, wherein the one or more instructions further cause the vehicle device to:

identify duplicate addresses of the messages received by the CAN bus; and remove the duplicate addresses, from the messages, to determine the unique addresses of the messages received by the CAN bus.

20. The non-transitory computer-readable medium of claim 15, wherein the one or more instructions, that cause the vehicle device to combine the unique addresses, of the messages received by the CAN bus, to generate the unique identifier, cause the vehicle device to:

identify duplicate addresses of the messages received by the CAN bus;

remove the duplicate addresses, from the messages, to determine the unique addresses of the messages received by the CAN bus; and combine the unique addresses to generate the unique identifier.

\* \* \* \* \*